May 29, 1956 S. D. WILTSE 2,747,898
BALL DETENT TUBE COUPLING
Filed June 16, 1952
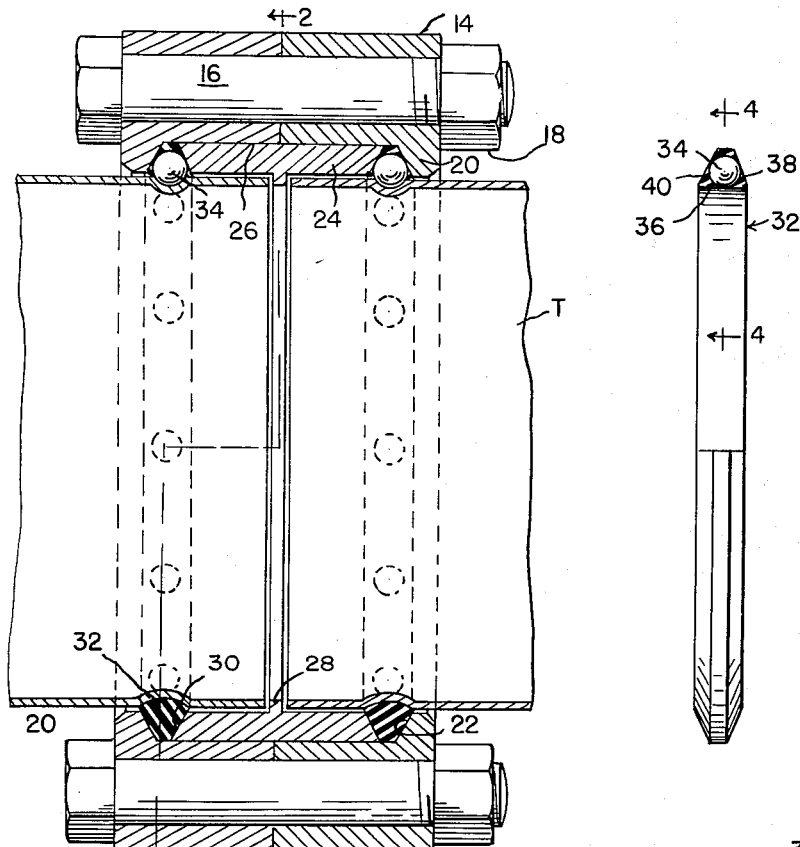
FIG.3.
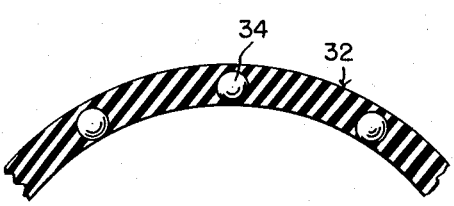
FIG.4.
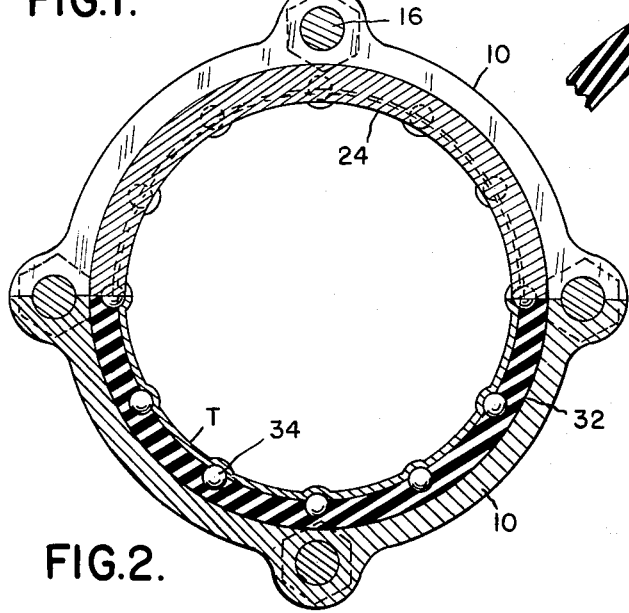
FIG.1.
FIG.2.
*INVENTOR.*
SUMNER D. WILTSE
BY Whattemore
Hulbert & Belknap
ATTORNEYS

United States Patent Office 2,747,898
Patented May 29, 1956

2,747,898
BALL DETENT TUBE COUPLING
Sumner D. Wiltse, Detroit, Mich.

Application June 16, 1952, Serial No. 293,712

7 Claims. (Cl. 285—142)

The present invention relates to a flexible tube connector.

It is an object of the present invention to provide a tube connector adapted for use with either thin walled or heavy walled tubing adapted to effect a firm positive mechanical interconnection between the ends of the pipes or tubing, and simultaneously to effect a seal for the joint.

More specifically, it is an object of the present invention to provide a tube connector including a pair of ball cages in conjunction with axially movable camming means for pressing the balls generally radially of the tubes into direct mechanical engagement therewith.

It is a further object of the present invention to provide in a tube connector of the character described a ball cage comprising an annular body of distortable material, preferably an elastic material such as rubber, synthetic rubber, or the like, and having embedded therein a plurality of uniformly spaced hardened balls, the annular body having an inner and side surfaces substantially tangent to the surfaces of the balls.

Other objects and features of the invention will become apparent as the description proceeds, especially when taken in conjunction with the accompanying drawings, wherein:

Figure 1 is an axial section through a tube joint employing the flexible tube connector.

Figure 2 is a section on the line 2—2, Figure 1.

Figure 3 is an edge view partly in section of a ball cage employed in the present invention.

Figure 4 is a fragmentary section on the line 4—4, Figure 3.

Referring now to the drawings the tube coupling comprises a pair of identical annular body members 10 and 12 each of which is provided with a plurality of radially outwardly extending ears 14 apertured for the reception of clamping bolts 16 having nuts 18 associated therewith. Each of the annular bodies 10 and 12 includes a radially inwardly extending flange 20, the flanges 20 having conically tapered ball engaging surfaces 22.

The coupling includes an annular spacer member 24 having an outside diameter dimensioned to be snugly received within the annular body members 10 and 12 and to closely engage the cylindrical surfaces 26 of the body members. The spacer member 24 includes a centrally located inwardly extending radial flange 28 constituting a tube stop element. The end surfaces of the spacer member 24 are conically inclined as indicated at 30. Preferably, the included cone angles of the conical surfaces 22 and 30 are equal and in the present embodiment of the invention the included angle between adjacent straight line elements of these surfaces is illustrated as approximately 60 degrees. The straight line elements of the conical surfaces 22 and 30 are equally inclined to the straight line elements of the tubes T and accordingly, the straight line elements of the conical surfaces each make an angle of approximately 60 degrees to the adjacent straight line elements of the tubes. This arrangement permits embedding of the hardened steel balls 40 to a substantial depth while forming a truly spherical ball seat. It will be appreciated that if the straight line elements of the conical surfaces extended at a small angle to the adjacent straight line elements of the tube T, movement of the balls into substantial embedded relation would produce elongated rather than truly spherical recesses or ball seats in the outer surface of the tubes T. However, the cone angle of these surfaces need not be equal and the angle may vary substantially from the illustrated 60 degrees included angle. To obtain the desired substantially radially inward ball movement, however, the angle should not be less than 45 degrees.

Disposed between the conical surfaces 22 and 30 at each end of the spacer member 24 is a ball cage 32, details of which are best seen in Figures 3 and 4. The ball cage 32 comprises an annular body formed of a deformable material, preferably an elastic material such as rubber, synthetic rubber, or the like. The specific material used to form the annular body member of the ball cage will of course depend upon the environment in which the coupling operates. Thus, for example, if the coupling is subjected to elevated temperatures, a temperature resistant material will be employed. In like manner, if the coupling is used in conjunction with hydrocarbons, the material of the annular body of the ball cage will be selected to resist destructive action of such hydrocarbons. The body member of the ball cage 32 is generally triangular in cross-section, although preferably the outer apex of the triangle is removed to cause the true cross-section of the annular body to be substantially trapezoidal.

Embedded within the material of the ball cage are a plurality of balls 34, these balls preferably being formed of hardened steel. In the present case the balls are illustrated as spaced apart a substantial distance, the circumferential spacing between adjacent balls being between three and four times the diameter of the balls. The number of balls, the size of the balls, and the spacing of the balls may however be substantially varied. Referring to Figure 3, it will be observed that the balls 34 are substantially tangent to the inner surface 36 of the annular body and also are substantially tangent to the inclined side walls 38 and 40 thereof.

The internal diameters of the annular bodies 10 and 12 and of the end portions of the spacer member 24 are equal and are somewhat larger than the outside diameter of the tubes T for which the coupling is designed. As a result of this, appreciable clearance exists between the outer surface of the tube T and the inner surfaces of the annular bodies 10 and 12 and the spacer member 24, thus permitting movement of the coupled tube ends in the annular bodies. This clearance however is very small and prevents extrusion of rubber material from the annular body of the ball cage 32 under the pressure conditions established by completing the coupling.

When the ends of the tubes T are inserted to a depth determined by the stop element 28, the ball cages are confined in annular spaces defined by the conical surfaces 22 and 30, the inner surfaces 26 of the annular bodies 10 and 12, and the outer surface of the tubes T. The annular bodies 10 and 12 are now drawn together by tightening the nuts 18, thereby establishing pressure on the ball cages. The dimensions of the balls, the annular bodies 10 and 12, and the spacer member 24, are predetermined so that when the annular members 10 and 12 are brought into firm engagement with each other, the balls 34 will be forced radially inwardly to the position illustrated in Figure 1. At the same time the deformable and preferably elastic material of the body member of the ball cages 32 will be substantially compressed and will produce an effective fluid-tight seal around the ends of the tubes T. Where the tubes T are thin walled tubing, the pressure developed in the deformable material of the annular body of the ball cages may form the material of the tube ends inwardly to produce shallow outwardly concave recesses. If the material of the tubes T is relatively heavy, the balls 34 will merely form indentations in the outer surfaces of the tubes similiar to a Brinelling operation and the material of the annular body of the ball cages will merely be pressed into firm sealing engagement with the adjacent surfaces of the tube and coupling.

When assembled the tubes are secured in the coupling in a flexible manner and are effectively sealed against leakage by positive means. The function of the balls 34 is to effect a mechanical connection between the tubes and to prevent pulling out of the tubes under high pressure or mechanical stress in use.

The coupling can be disassembled and re-assembled in which case care should be exercised to insure registration between the balls 34 and previously formed indentations in the ends of the tube.

The drawings and the foregoing specification constitute a description of the improved tube coupling in such full, clear, concise and exact terms as to enable any person skilled in the art to practice the invention, the scope of which is indicated by the appended claims.

What I claim as my invention is:

1. A tube coupling comprising a pair of axially aligned, generally tubular, rigid, annular members having their inner ends spaced apart prior to assembly with tubes to be coupled and having at the outer ends thereof generally radially inwardly extending flanges, a rigid annular spacer disposed within said annular members and having end surfaces spaced axially inwardly from said flanges, the confronting surfaces of said flanges and the end surfaces of said spacer being conical to define radially outwardly narrowing spaces therebetween, a ball cage assembly in each of said spaces including an annular array of rigid balls and an annular body of deformable material in which said balls are embedded, the cross-sectional shape of said cage conforming substantially to that of said spaces, said deformable material and balls substantially filling said spaces and said balls being substantially tangent to the end and radially inner surfaces of said ball cages, and clamping means extending between said annular members and effective to move said members only in an axial direction toward each other whereby the confronting surfaces of said flanges and the end surfaces of said spacer both engage said balls to force said balls inwardly toward the axis of said coupling to form individual separate substantially spherical seats in tube ends.

2. A tube coupling as defined in claim 1 in which the end surfaces of said spacer and the confronting surfaces of said flanges constitute conical surfaces inclined to the axis of said coupling at an angle of about 60 degrees.

3. A tube coupling as defined in claim 1 in which said spacer is dimensioned to provide for abutment between the inner ends of said annular members to limit inward displacement of said balls.

4. A tube coupling as defined in claim 1 in which said ball cages are of a rubber-like material.

5. A tube coupling as defined in claim 4 in which the inner ends of said annular members are provided with inside cylindrical surfaces telescopically receiving said spacers and are adapted to be brought into abutment in assembly to thereby limit inward displacement of said balls, and in which the spaces defined between the end surfaces of the spacer and the confronting surfaces of said flanges, the inside surfaces of said members and the exterior surfaces of the tubes received in said coupling form a substantially closed space of the cross-sectional size of the annular bodies of said ball cages so as to apply a predetermined high compression to said bodies when said members are in abutment.

6. A tube coupling as defined in claim 1 in which the inside diameter of said spacer and the flanges on said annular members exceeds the outside diameter of tubes for which the coupling is designed to provide for limited flexibility of the coupling.

7. A tube coupling as defined in claim 1 in which said balls are spaced apart circumferentially a distance several times as great as the diameter of said balls.

References Cited in the file of this patent

UNITED STATES PATENTS

| | | |
|---|---|---|
| 1,749,944 | Kalo | Mar. 11, 1930 |
| 2,219,053 | Osborn | Oct. 22, 1940 |
| 2,221,064 | Tabler | Nov. 12, 1940 |
| 2,283,975 | Dillon | May 26, 1942 |
| 2,444,380 | Shimek | June 29, 1948 |
| 2,531,922 | Seamark | Nov. 8, 1950 |
| 2,570,224 | Fason | Oct. 9, 1951 |

FOREIGN PATENTS

| | | |
|---|---|---|
| 532,124 | Great Britain | Jan. 17, 1941 |